United States Patent [19]
Harris

[11] 3,995,319
[45] Nov. 30, 1976

[54] TAPE RECORDER CASSETTE ADAPTED TO INDICATE THE NUMBER OF TIMES THE TAPE IS PLAYED

[75] Inventor: David Peter Harris, London, England

[73] Assignee: Action Design Limited, London, England

[22] Filed: Dec. 26, 1974

[21] Appl. No.: 536,631

[52] U.S. Cl. .............................. 360/137; 242/199; 360/132
[51] Int. Cl.² .................... G11B 23/28; G11B 23/44
[58] Field of Search ............... 360/132, 137, 79, 80; 242/198, 199, 200

[56] References Cited
UNITED STATES PATENTS

| | | | |
|---|---|---|---|
| 3,604,624 | 9/1971 | Miura | 360/137 |
| 3,630,170 | 12/1971 | Christo | 360/132 |
| 3,678,215 | 7/1972 | Kihara | 360/132 |
| 3,821,816 | 6/1974 | Habelt | 242/198 |

*Primary Examiner*—Jay P. Lucas
*Attorney, Agent, or Firm*—Laff, Whitesel & Rockman

[57] ABSTRACT

A tape recorder cassette is provided with a counter in one of its corners. The counter has a spring-biassed arm which bears on the tape so that the number of times the tape is played can be counted. In one embodiment, the counter is provided with a stop which stops the arm at an integral count. In another, when the tape spool is empty, the arm is biassed to a neutral position clear of the spool.

6 Claims, 4 Drawing Figures

TAPE RECORDER CASSETTE ADAPTED TO INDICATE THE NUMBER OF TIMES THE TAPE IS PLAYED

According to the invention there is provided a tape recorder cassette provided with a counter located in a corner of the cassette and provided with a spring-biassed arm for bearing on the tape to count the number of times the tape is played, the arrangement being such that the counter counts as the arm moves inwardly with respect to the tape, the counter being provided with a stop arranged to stop the arm at an integral count.

Further according to the invention there is provided a tape recorder cassette comprising two spools and a tape and provided with a counter located in a corner of the cassette, the counter being provided with a spring-biassed arm for bearing on the tape wound on one of said spools to count the number of times the tape is played, the biassing of the arm being such that when said one of said spools is empty the arm is biassed to a neutral position clear of said spool.

The invention will be further described by way of example with reference to the accompanying drawings, which illustrate various embodiments of the invention.

Figure 1:
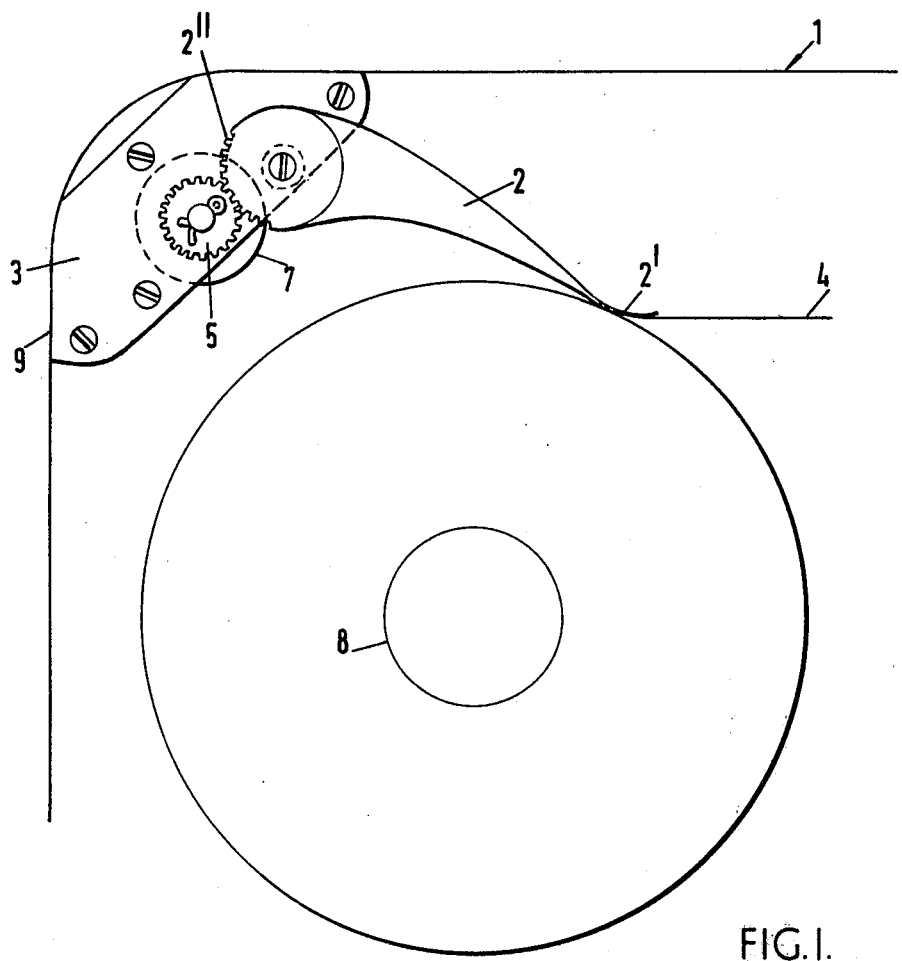
FIG. 1 is a plan view of the corner of a tape recorder cassette constituting an embodiment of the invention.
Figure 2:
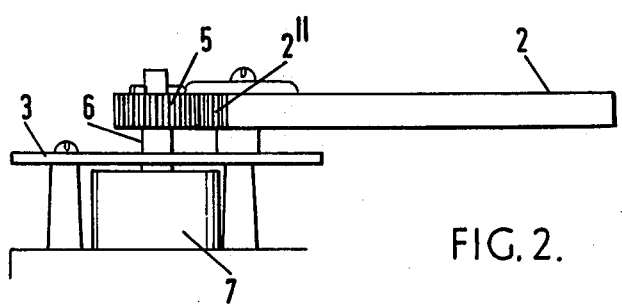
FIG. 2 is a side view of the apparatus of FIG. 1.
Figure 3:
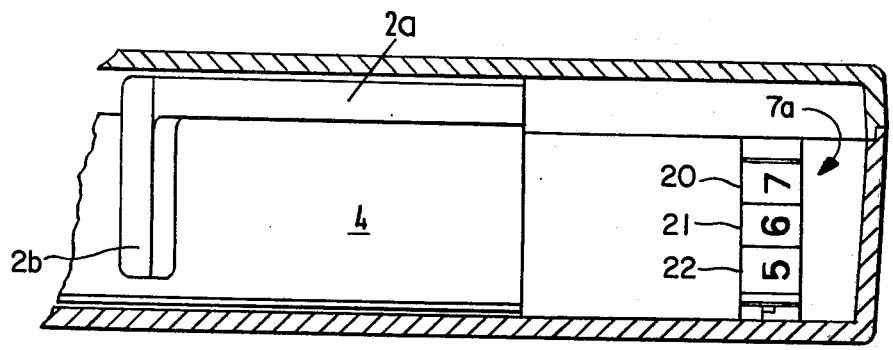
FIG. 3 is a side view of a corner of a tape recorder cassette constituting a further embodiment of the invention.

Referring to FIGS. 1 and 2, a tape recorder cassette 1 is fitted with an arm 2 pivotably attached to a fixing plate 3 secured in the corner of the cassette 1. The end 2' of arm 2 remote from the plate 3 is smoothly curved so as not to impede winding or unwinding of tape 4. Preferably, the width of part 2' is approximately equal to the width of tape 4, as seen in FIG. 3. Part 2'' of arm 2 is arcuate and toothed, the teeth meshing those of a gear wheel 5 provided on the axle 6 of counter 7. While any of various counters may be used, I anticipate use of one having three digital positions to store a count which ranges from "000" to "999", as seen in FIG. 3. In this embodiment, the spring-biassing of arm 2 is provided by a spring (not shown) within counter 7 which spring-biasses axle 6, but the arm 2 could alternatively be provided with its own spring, e.g. a spiral spring.

When the tape 4 wound on spool 8 grows past a certain point, for example, just before the end of the tape, arm 2 moves past a predetermined position thereof and counter 7 registers a single count. The total count can be read through a window of the side 9 of cassette 1.

The spring-biassing is such that when the tape 4 is entirely wound on the opposite spool to spool 8 (not shown), and 2' thereof is spring-biassed to a neutral position between the spool 8 and the said predetermined position, the spring acting in the opposite direction if end 2' passes the neutral position alternatively some simple mechanical stop may be utilised. This avoids the possibility that, when the tape is on the opposite spool, the arm 2 may get into a position wherein winding of the tape would be impeded or wherein its functioning as above would be prevented.

Figure 4:
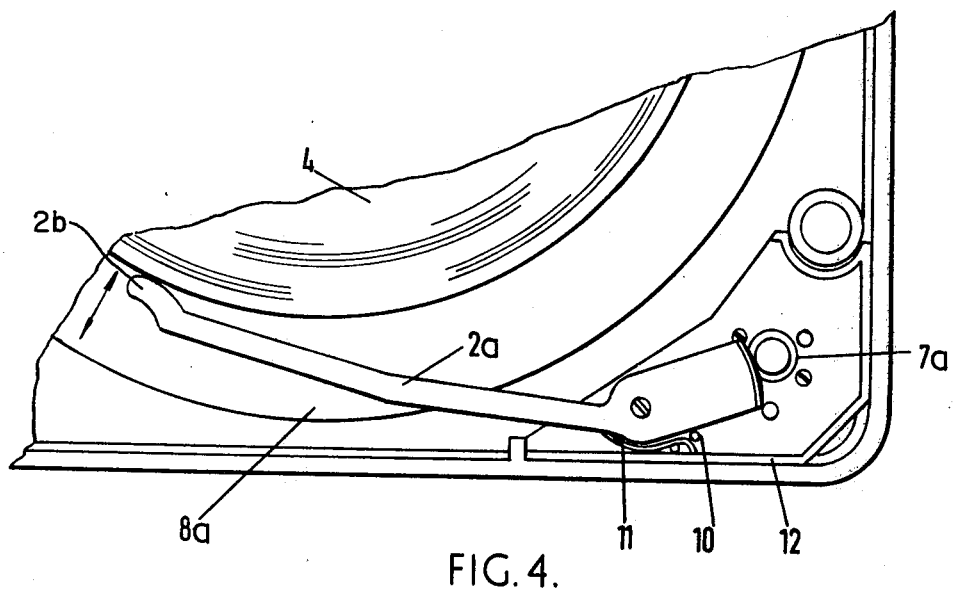
FIG. 4 is a plan view of the corner of the cassette of FIG. 3, the top of the cassette being removed.

The embodiment described with reference to FIGS. 3 and 4 differs from the first embodiment in that the arm 2a is arranged to bear at 2b on the tape 4 as it is unwound. As best seen in FIG. 3, the width of the part 2b is approximately equal to the width of the tape 4, in order to spread wear over a maximum distance across the surface of the tape. Thus the arm 2a swings inwardly with respect to the spool 8a in contrast to the first embodiment, where the arm 2 moves outwardly with respect to the spool 8.

The counter 7a counts as the arm 2a moves inward but does not count as it moves outward. Counters which have this feature are well-known. In the embodiment shown in FIG. 3, the counter has a three digit display 20, 21, 22 to provide for displaying any count between "000" and "999". As the tape 4 is played, the arm 2a swings inwardly until it reaches a certain point, whereupon it is stopped by a stop 10. The stop 10 is so positioned that the counter is exactly at an integral count, (and not, for example, halfway between two counts), when the arm 2a is stopped by the stop 10.

This embodiment has an advantage in that, since the arm is moving inwardly while counting takes place, it is easy to arrange that the arm stops at an integral count. Such arrangement cannot be made accurately if the arm is moving outwards as counting takes place since the maximum diameter of the tape reel is somewhat variable, due to tape stretching or other causes.

Further differences of this embodiment and the preceding one lie in the provision of an external return spring 11 and a mounting unit 12 which is so shaped that it can be dropped into and is located by the configuration of the corner of the cassette.

I claim:

1. A tape recorder cassette comprising at least one spool of tape wound on a hub region, the radius of said tape winding reducing as tape is drawn from said spool, spring biased arm means mounted in said cassette and riding on the periphery of said tape winding whereby said arm moves over a distance equal to the reduction of said radius each time that said tape is drawn from said spool, counter means in said cassette responsive to said arm moving over at least a predetermined part of said radius reduction for storing a count each time that said tape is drawn from said spool, and means in said cassette for stopping movement of said arm each time that said counter stores an integral count.

2. The cassette of claim 1 wherein said counter means has a capacity for storing and displaying any count from "000" to "999".

3. The cassette of claim 1 wherein the part of said arm which rides on said tape is gently curved and extends across substantially the full width of said tape at the area of contact with said tape to reduce wear upon said tape.

4. A tape recorder cassette having two spools with tape wound thereon, whereby said tape is wound on one spool as it unwinds from the other spool, and vice versa, spring biased arm means mounted to ride on the periphery of tape wound upon a first of said spools whereby said arm moves from a point near the periphery toward the hub of said first spool as said tape unwinds from said first spool and returns toward the periphery as said tape rewinds on said first spool, the arm reaching a neutral point where it stands clear of the tape when a predetermined amount of tape has been unwound from said first spool, and counter means in said cassette responsive to movement of said arm for counting the number of times that the tape is played.

5. The cassette of claim 4 wherein said counter means has a capacity for storing and displaying any count from "000" to "999".

6. The cassette of claim 4 wherein the part of said arm which rides on said tape is gently curved and extends across substantially the full width of said tape at the area of contact with said tape to reduce wear upon said tape.

* * * * *